US010000289B2

(12) United States Patent
Fernandes et al.

(10) Patent No.: US 10,000,289 B2
(45) Date of Patent: Jun. 19, 2018

(54) TEMPERATURE CONTROL GASPER APPARATUS

(75) Inventors: Leslie Fernandes, La Canada, CA (US); Charlie Rann, Woodland Hills, CA (US); Krist Khodjasaryan, Glendale, CA (US)

(73) Assignee: Senior IP GmbH, Schaffhausen (CH)

( * ) Notice: Subject to any disclaimer, the term of this patent is extended or adjusted under 35 U.S.C. 154(b) by 927 days.

(21) Appl. No.: 13/365,201

(22) Filed: Feb. 2, 2012

(65) Prior Publication Data

US 2013/0203332 A1  Aug. 8, 2013

(51) Int. Cl.
*B64D 13/08* (2006.01)
*G05D 23/13* (2006.01)
*B64D 13/00* (2006.01)
*B60H 1/34* (2006.01)

(52) U.S. Cl.
CPC ........... *B64D 13/00* (2013.01); *B60H 1/3442* (2013.01); *B60H 2001/3485* (2013.01); *B64D 2013/003* (2013.01)

(58) Field of Classification Search
CPC . B64D 13/00; B64D 2013/003; B60H 1/3442
USPC ........................................................ 454/76
See application file for complete search history.

(56) References Cited

U.S. PATENT DOCUMENTS

| | | |
|---|---|---|
| 198,789 A | 1/1878 | Brainerd |
| 979,955 A | 12/1910 | Hulings |
| 1,607,935 A | 11/1926 | Ackley |
| 2,481,059 A | 9/1949 | Africano |
| 2,603,469 A | 7/1952 | Bedford et al. |
| 2,790,680 A | 4/1957 | Rosholt |
| 2,830,523 A * | 4/1958 | Vehige .......................... 454/323 |
| 2,961,167 A | 11/1960 | Skaist |
| 2,974,580 A | 3/1961 | Zimmerman et al. |
| 2,997,243 A | 8/1961 | Kolb |
| 3,003,755 A | 10/1961 | Peras |
| 3,018,969 A | 1/1962 | Gentry |
| 3,068,891 A * | 12/1962 | Panning ................. F24F 11/025 137/499 |

(Continued)

FOREIGN PATENT DOCUMENTS

| | | |
|---|---|---|
| DE | 3827697 | 2/1990 |
| DE | 19758275 | 7/1998 |

(Continued)

*Primary Examiner* — Alissa Tompkins
*Assistant Examiner* — Phillip E Decker
(74) *Attorney, Agent, or Firm* — Greenberg Traurig, LLP

(57) ABSTRACT

A temperature control gasper apparatus for vehicle interiors such as aircraft cabins. Airflow temperature, volume and orientation are integrated and controlled by the gasper apparatus—at the point of use of the gasper apparatus. The temperature control gasper apparatus includes a mixing chamber, a temperature control dial, and an airflow control nozzle assembly. The temperature control gasper apparatus provides airflow output control with rotation of a grip member of the nozzle assembly relative to a ball portion of the mixing chamber, temperature control by rotation of a handle portion of the temperature control dial relative to the ball portion of the mixing chamber, and airflow direction control by movement of the ball portion of the mixing chamber relative to a socket portion of the mixing chamber fixed to the vehicle interior.

11 Claims, 7 Drawing Sheets

(56) References Cited

U.S. PATENT DOCUMENTS

| | | |
|---|---|---|
| 3,113,502 A | 12/1963 | Kallel et al. |
| 3,318,225 A | 5/1967 | May |
| 3,335,961 A | 8/1967 | Marrafino |
| 3,396,904 A * | 8/1968 | Janette ................ F04D 29/4213 251/212 |
| 3,529,774 A | 9/1970 | Apri |
| 3,765,316 A | 10/1973 | Skoch |
| 3,802,328 A * | 4/1974 | Kakizaki ....................... 454/154 |
| 3,922,959 A * | 12/1975 | Treffers ................ F24F 13/065 454/286 |
| 4,524,679 A * | 6/1985 | Lyons .................. F24F 13/065 454/286 |
| 4,662,387 A * | 5/1987 | King, Sr. ....................... 137/268 |
| 4,716,818 A | 1/1988 | Brown |
| 4,848,669 A * | 7/1989 | George ................ F24F 13/065 454/286 |
| 4,978,064 A | 12/1990 | Steiner |
| 5,328,152 A * | 7/1994 | Castle .................. B60H 1/3442 454/286 |
| 5,399,119 A * | 3/1995 | Birk ..................... B60H 1/3442 454/286 |
| 5,769,114 A * | 6/1998 | Ko ............................. 137/454.6 |
| 6,364,760 B1 * | 4/2002 | Rooney ........................ 454/154 |
| 6,719,623 B1 | 4/2004 | Kodaveridan et al. |
| 7,014,557 B2 | 3/2006 | Thomassin et al. |
| 7,070,496 B2 * | 7/2006 | Thomassin et al. ............ 454/76 |
| 7,093,821 B2 * | 8/2006 | Howe .............................. 454/76 |
| 7,188,786 B2 | 3/2007 | Dodd |
| 7,527,402 B2 * | 5/2009 | Scown ................ B60H 1/3442 362/234 |
| 7,871,020 B2 | 1/2011 | Nelson et al. |
| 2004/0171342 A1 | 9/2004 | Kodaveridan et al. |
| 2004/0232260 A1 | 11/2004 | Chen |
| 2005/0247353 A1 | 11/2005 | Kao |
| 2006/0116063 A1 | 6/2006 | Seume et al. |
| 2009/0163131 A1 | 6/2009 | Walkinshaw et al. |
| 2010/0093267 A1 | 4/2010 | Hogh et al. |

FOREIGN PATENT DOCUMENTS

| | | | |
|---|---|---|---|
| FR | 2892342 A1 * | 4/2007 | ........... B60H 1/3442 |
| GB | 718143 | 11/1954 | |
| GB | 2 221 283 | 1/1990 | |
| JP | 57009369 | 1/1982 | |

* cited by examiner

US 10,000,289 B2

TEMPERATURE CONTROL GASPER APPARATUS

FIELD OF THE INVENTION

The present disclosure relates to apparatuses for controlling and outputting airflow into an interior of a vehicle, such as a passenger cabin of an airplane, and particularly to gaspers providing variable airflow to a vehicle interior.

BACKGROUND OF THE DISCLOSURE

Interior climate control options are desirable to the passengers of enclosed vehicles, such as airplanes. In one example, it is common in current commercial aircraft to include nozzle devices, or "gaspers," for providing airflow to passengers and other users of airplanes. Such gaspers for passengers are typically provided for every seating location and disposed at the underside of the overhead baggage compartments, near passenger overhead lighting. Such gaspers are typically only variable at the point of use in their orientation and in the amount of airflow. Accordingly, a gasper apparatus enhancing the control and variability of the airflow at the point of use, including the ability to alter the temperature of the air emanating from the gasper, is desirable.

SUMMARY OF THE INVENTION

The present disclosure provides a temperature control gasper apparatus for integrating airflow temperature, volume and orientation control from the gasper apparatus at the point of use of the gasper apparatus within a vehicle interior. The gasper apparatus comprises a mixing chamber having a socket portion fixed to the vehicle interior and a ball portion coupled to the socket portion. The mixing chamber defines an interior mixing region between the socket portion and the ball portion. The socket portion has a first inlet in fluid communication with a first air supply at a first temperature and a second inlet in fluid communication with a second air supply at a second temperature. The first and second inlets are in selective fluid communication with the interior mixing region, and the first temperature and the second temperature being different from each other.

The gasper apparatus further comprises a temperature control dial having a handle portion rotatably coupled to the ball portion of the mixing chamber and a seal portion rotatably coupled to the socket portion of the mixing chamber. The temperature control dial couples the handle portion and the seal portion with a hinge member, and the hinge member rotatably fixes the handle portion and the seal portion together and provides for movement of the handle portion and the ball portion of the mixing chamber relative to the seal portion and the socket portion of the mixing chamber. The handle portion and the seal portion rotate relative to the mixing chamber and position the seal portion to selectively vary fluid communication between the first and second inlets and the interior mixing region.

The gasper apparatus further comprises an airflow control nozzle assembly having a grip portion rotatably coupled to the ball portion of the mixing chamber. The grip portion moves axially relative to the ball portion of the mixing chamber upon rotation relative to the ball portion of the mixing chamber. The nozzle assembly further has an output aperture fixed relative to the grip portion and a stop member axially fixed relative to the ball portion of the mixing chamber. The output aperture is in selective fluid communication with the interior mixing region.

The gasper apparatus provides airflow output control with rotation of the grip member of the nozzle assembly relative to the ball portion of the mixing chamber, temperature control by rotation of the handle portion of the temperature control dial relative to the ball portion of the mixing chamber, and airflow direction control by movement of the ball portion of the mixing chamber relative to the socket portion.

In some preferred embodiments, the rotation of the grip member of the nozzle assembly relative to the ball portion of the mixing chamber is concentric to rotation of the handle portion of the temperature control dial relative to the ball portion of the mixing chamber.

In some preferred embodiments, the seal portion of the temperature control dial includes first and second apertures to selectively vary fluid communication between the first and second inlets and the interior mixing region with rotation of the seal portion relative to the socket portion of the mixing chamber.

In some preferred embodiments, a first position of the seal portion overlaps the first aperture with the first inlet and spaces the second aperture away from the second inlet such that the second inlet is sealed from fluid communication with the interior mixing region, a second position of the seal portion overlaps the second aperture with the second inlet and spaces the first aperture away from the first inlet such that the first inlet is sealed from fluid communication with the mixing region, and intermediate positions of the seal portion between the first and second positions vary the fluid communication between the first and second inlets and the interior mixing region.

In some preferred embodiments, the first and second apertures each include a tapered portion.

In some preferred embodiments, the first and second apertures are each teardrop-shaped.

In some preferred embodiments, the first aperture is oriented such that the tapered portion overlaps the first inlet when the seal portion is rotated proximate the second position from the first position, and the second aperture is oriented such that the tapered portion overlaps the second inlet when the seal portion is rotated proximate the first position from the second position.

In some preferred embodiments, the ball portion of the mixing chamber includes two base cylinder segments engaging the handle portion of the temperature control dial and the grip portion of the nozzle assembly.

In some preferred embodiments, the temperature control dial further includes interior webbing portions, the handle portion and the webbing portions define at least two slots therebetween, and the slots receive the base cylinder segments of the ball portion of the mixing chamber and define a range of motion of the base cylinder segments and the ball portion relative to the handle portion.

In some preferred embodiments, the base cylinder segments include radially-outwardly facing threaded portions, the grip portion of the nozzle assembly includes a complementary radially-inwardly facing threaded portion, and the grip portion and the base cylinder segments rotatably engage at the threaded portions.

In some preferred embodiments, the temperature control gasper further comprises an annular sealing ring coupled between the socket portion of the mixing chamber and the sealing portion of the temperature control dial.

In some preferred embodiments, the temperature control gasper apparatus further comprises an annular sealing ring coupled between the ball portion of the mixing chamber and the handle portion of the temperature control dial.

In another preferred embodiment, a temperature control gasper apparatus for integrating airflow temperature and volume control from the gasper apparatus at the point of use of the gasper apparatus in a vehicle interior is provided. The gasper apparatus comprises a mixing chamber defining an interior mixing region therewithin. The mixing chamber has a first inlet in fluid communication with a first air supply at a first temperature and a second inlet in fluid communication with a second air supply at a second temperature. The first and second inlets are in selective fluid communication with the interior mixing region, and the first temperature and the second temperature are different from each other.

The temperature control gasper apparatus further comprises a temperature control dial having a handle portion and a seal portion. The handle portion is movably coupled to the mixing chamber outside of the interior mixing region. The seal portion is coupled to the handle portion and disposed proximate the first and second inlets. The handle portion moves relative to the mixing chamber and positions the seal portion to selectively vary fluid communication between the first and second inlets and the interior mixing region.

The temperature control gasper apparatus further comprises an airflow control nozzle assembly coupled to the mixing chamber outside of the interior mixing region. The nozzle assembly provides selective and variable fluid communication between the interior mixing region and the vehicle interior. The nozzle assembly is oriented to be complementary to the handle portion of the temperature control dial.

In some preferred embodiments, the mixing chamber further includes an outlet face and a back face spaced apart from the outlet face and the first and second inlets are disposed adjacent each other on the back face.

In some preferred embodiments, the outlet face and the back face of the mixing chamber are round in shape, and the mixing chamber is cylindrical in shape between the outlet face and the back face.

In some preferred embodiments, the handle portion of the temperature control dial is annular in shape, encircles the outlet face of the mixing chamber, and is rotatably coupled to the outlet face of the mixing chamber.

In some preferred embodiments, the handle portion of the temperature control dial rotates between a first position and a second position relative to the outlet face of the mixing chamber, the first and second positions being substantially 135° apart from each other.

In some preferred embodiments, the seal portion of the temperature control dial seals the second inlet of the mixing chamber from fluid communication with the interior mixing region at the first position of the handle portion, and the seal portion seals the first inlet of the mixing chamber from fluid communication with the interior mixing region at the second position of the handle portion.

In some preferred embodiments, the first temperature is substantially 60° F. and the second temperature is substantially 90° F.

Further objects and advantages of the present disclosure, together with the organization and manner of operation thereof, will become apparent from the following detailed description when taken in conjunction with the accompanying drawings.

DETAILED DESCRIPTION

Figure 1:
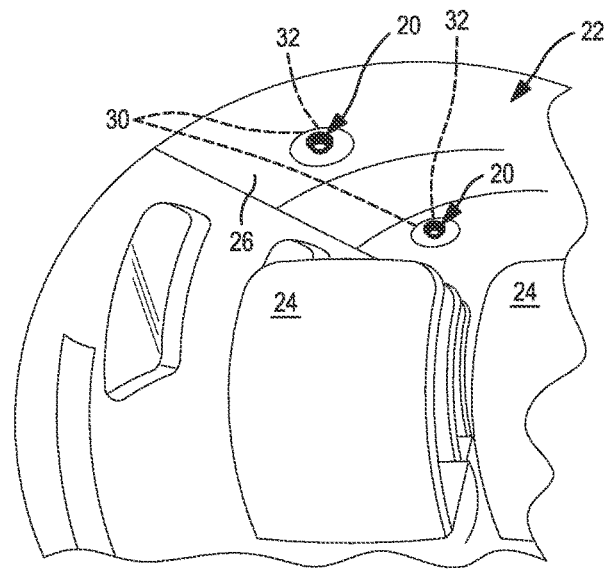
FIG. 1 of the drawings is a perspective and schematic view of exemplary temperature control gasper apparatuses disposed within a vehicle interior, each coupled to both first and second air supplies, according to the principles of the present disclosure.

The present disclosure is further described with reference to the accompanying drawings, which show particular embodiments of the disclosure. However, it should be noted that the accompanying drawings are merely exemplary. For example, the various elements and combinations of elements described below and illustrated in the drawings can vary to result in embodiments which are still within the spirit and scope of the present disclosure.

With reference to FIG. 1, exemplary temperature control gasper apparatuses 20 are disposed within vehicle interior 22 of a vehicle, such as within the cabin of an aircraft. Gasper apparatuses 20 are located proximate seats 24 on surface 26. In some embodiments in which vehicle interior 22 is that of an aircraft, surface 26 corresponds to the underside of the overhead baggage compartments. As schematically illustrated, gasper apparatuses 20 are coupled to first and second air supplies 30 and 32, which provide air to gasper apparatuses 20 at first and second temperatures, respectively, as further disclosed herein. Gasper apparatuses 20 provide selectively variable airflow to users of the vehicle located at seats 24. More particularly, according to the principles of the present disclosure, gasper apparatuses 20 integrate airflow temperature and volume control from each respective gasper, apparatus 20 at the point of use of each respective gasper apparatus 20 in vehicle interior 22. As such, according to the principles of the present disclosure, users of the vehicle, such as passengers of an aircraft, can adjust both the rate and the actual temperature of the airflow from respective gasper apparatuses 20, according to their respective individual preferences.

Figure 2:
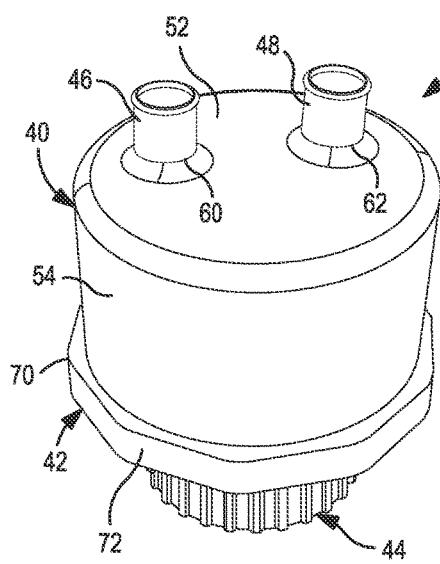
FIG. 2 is a top perspective view of an exemplary temperature control gasper apparatus, according to the principles of the present disclosure showing its back end.
Figure 3:
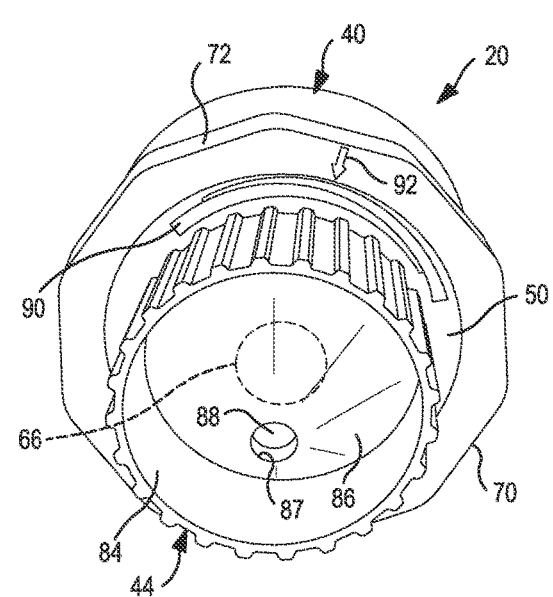
FIG. 3 is a bottom perspective view of the temperature control gasper apparatus of FIG. 2.

With further reference to FIGS. 2-3, an exemplary temperature control gasper apparatus 20 according to the principles of the present disclosure includes mixing chamber 40, temperature control dial 42, and airflow control nozzle assembly 44. According to the principles of the present disclosure, first and second air supplies 30 and 32 are in fluid communication with mixing chamber 40. In some embodiments, first and second spigots 46 and 48 are coupled to mixing chamber 40 to facilitate fluid communication with first and second air supplies 30 and 32, respectively, as further disclosed herein. Referring additionally to FIG. 1, as also further disclosed herein, when temperature control gasper apparatus 20 is disposed in vehicle interior 22, temperature control dial 42 and airflow control 44 are selectively operable to adjust the temperature and the rate of the airflow, respectively, from gasper apparatus 20.

Figure 4A:
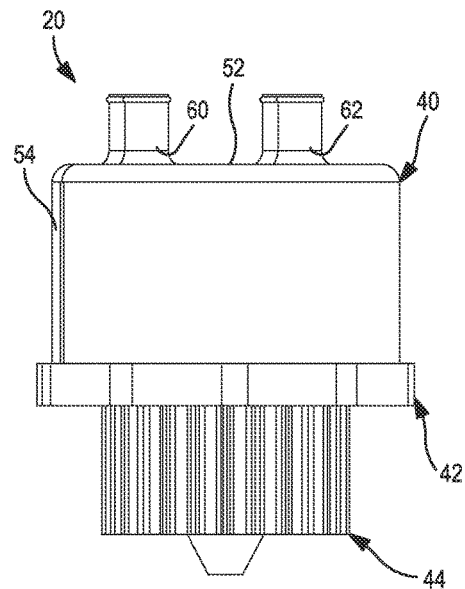
FIGS. 4A-4C are elevated side views of the temperature control gasper apparatus of FIG. 2.
Figure 4B:
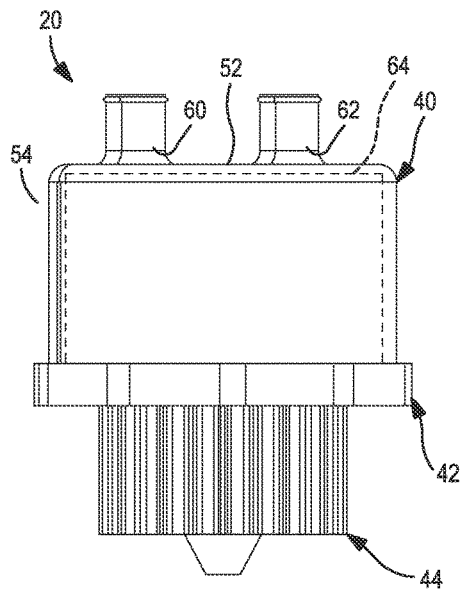
Figure 4C:
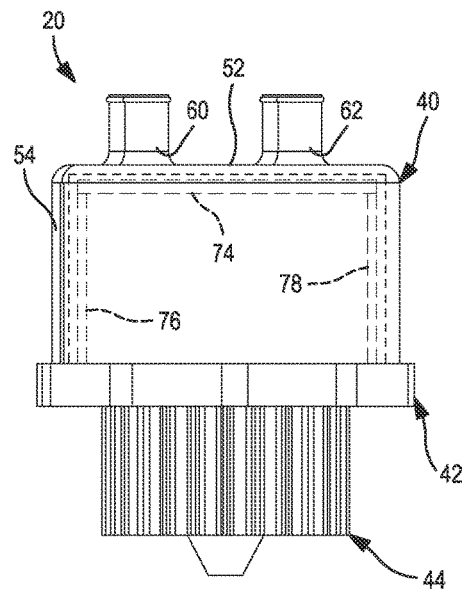
Figure 5:
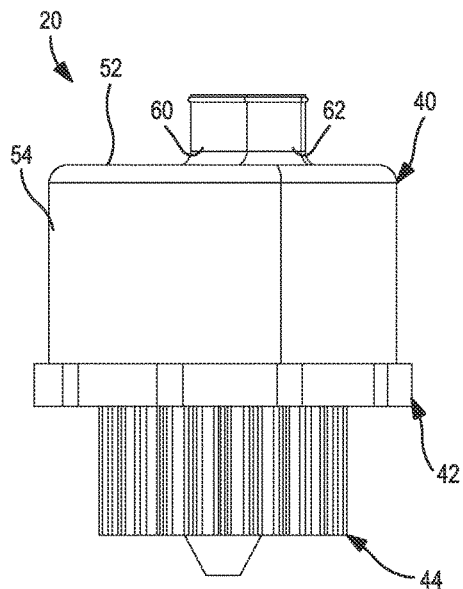
FIG. 5 is another elevated side view of the temperature control gasper apparatus of FIG. 2.

With further reference to FIGS. 2-3, mixing chamber 40 includes output face 50 and back face 52 spaced apart from, and opposing, output face 50. Output face 50 and back face 52 have complementary round shapes. Mixing chamber 40 further includes cylindrical main body 54 extending between output face 50 and back face 52. With additional reference to FIGS. 4A-4C, back face 52 includes first and second inlets 60 and 62 disposed therein. Mixing chamber defines interior mixing region 64 between output face 50, back face 52 and main body 54, and first and second inlets 60 and 62 are in fluid communication with interior mixing region 64. Output face 50 includes output outlet 66 disposed therein, and output outlet 66 is in fluid communication with interior mixing region 64. It should be understood that a mixing chamber according to the principles of the present disclosure can have a variety of shapes and configurations.

According to the principles of the present disclosure, first and second inlets 60 and 62 are fluidly coupled to first and second air supplies 30 and 32, respectively, to provide fluid communication between mixing chamber 40 and first and second air supplies 30 and 32. In this preferred embodiment, first and second inlets are configured to receive first and second spigots 46 and 48, respectively. First and second spigots 46 and 48 facilitate fluid communication between first and second inlets 60 and 62, respectively, and are fluidly coupled to first and second air supplies 30 and 32, respectively.

With continued reference to FIGS. 2-3 and 4A-4C, temperature control dial 42 includes handle portion 70 rotatably coupled to mixing chamber 40 about the perimeter of outlet face 50. Handle portion 70 is generally annular in shape and includes grip portions 72 on the outer surface thereof. Grip portions 72 provide a user surfaces to grip handle portion 70 to facilitate rotation of handle portion 70, to thereby control the temperature of the airflow output of gasper apparatus 20, according to the principles of the present disclosure.

As shown in the exemplary embodiment of the drawings, temperature control dial 42 further includes seal portion 74 and support posts 76 and 78. Seal portion 74 is disposed within interior mixing region 64 proximate back face 52 of mixing chamber 40. Support posts 76 and 78 couple handle portion 70 and seal portion 74. It should be understood that handle portion 70 and seal portion 74 of temperature control dial can be coupled in a variety of ways according to the principles of the present disclosure.

Figure 6A:
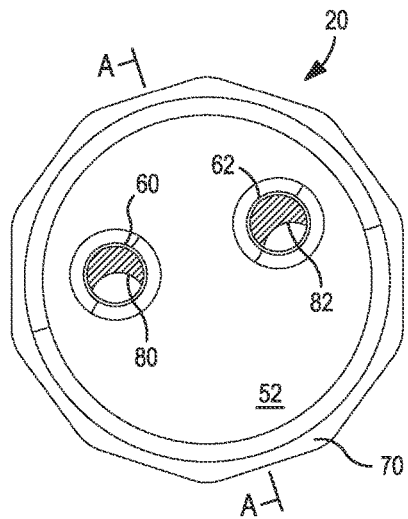
FIGS. 6A-6D are top plan views of the temperature control gasper apparatus of FIG. 2, each with the temperature control dial apertures in a different position, relative to the mixing chamber inlets respectively, according to the principles of the present disclosure.
Figure 6B:
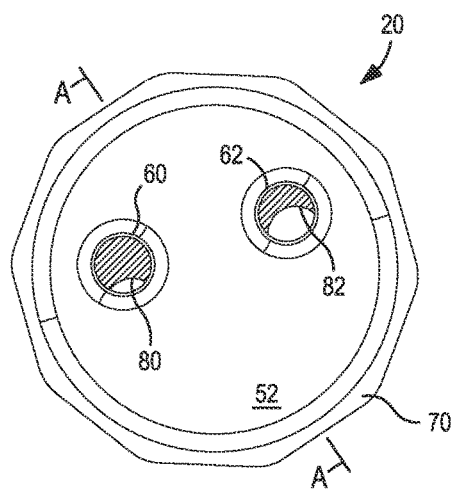
Figure 6C:
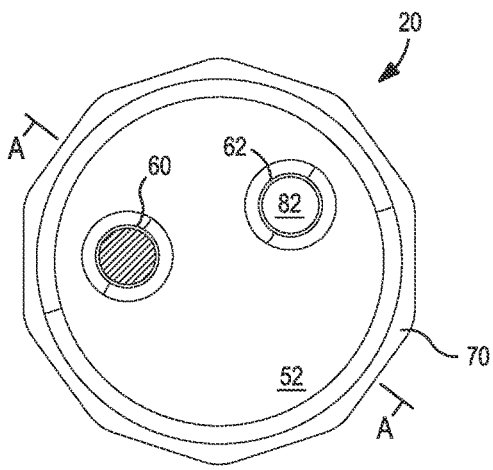
Figure 6D:
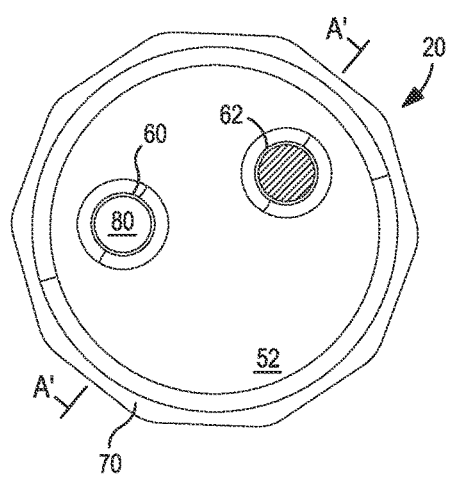
Figure 7:
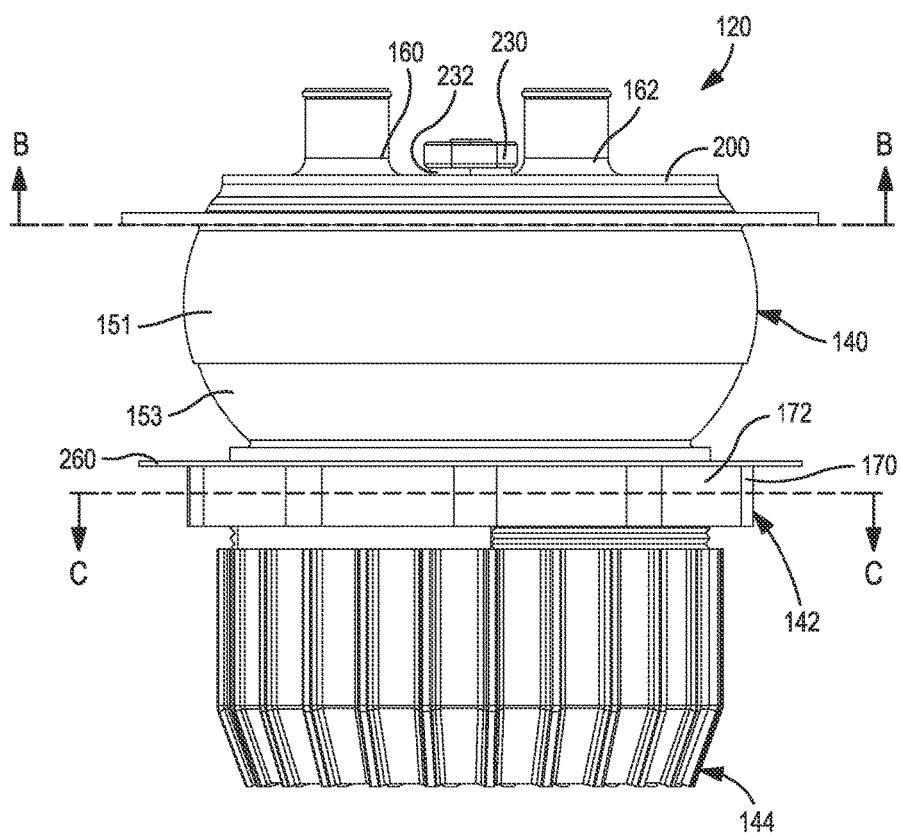
FIG. 7 is an elevated side view of another embodiment of temperature control gasper apparatus according to the principles of the present disclosure.

With reference to FIGS. 6A-6D, seal portion 74 has first and second apertures 80 and 82 extending therethrough. First and second apertures 80 and 82 are generally round in shape. It should be understood that the shape of seal portion apertures can vary, within the principles of the present disclosure. First and second apertures 80 and 82 are positioned complementary to first and second inlets 60 and 62 such that, as illustrated in FIG. 6A, first aperture 80 and first inlet 60 partially overlap while second aperture 82 and second inlet 62 partially overlap. In this intermediate configuration, both first and second inlets 60 and 62 are simultaneously in fluid communication with interior mixing region 64 and, therefore, air of both the first and second temperatures is mixed within mixing chamber 40. As illustrated in FIGS. 6B-6D, rotation of handle portion 70 and seal portion 74, highlighted by the varied position of illustrated reference line A'-A', varies the overlap between first and second apertures 80 and 82 with first and second inlets 60 and 62, respectively. Referring in particular to another intermediate position illustrated in FIG. 6B, the overlap between second aperture 82 and second inlet 62 is greater than the overlap between first aperture 80 and first inlet 60. In such a configuration, a greater amount of the air at the second temperature, from second air supply 32 enters mixing chamber 40 than the amount of air at the first temperature, from first air supply 30. As illustrated in FIGS. 6C and 6D, handle portion 70 and seal portion 74 may be positioned to seal off fluid communication between one of first and second inlets 60 and 62 from interior mixing region 64 and only allow fluid communication with the other of first and second inlets 60 and 62. Therefore, in accordance with the principles of the present disclosure, gasper apparatus 20 can vary the relative amounts airflow from first and second air supplies 30 and 32, including sealing off one of first and second air supplies 30 and 32 to, in turn, alter the temperature of the air emanating from nozzle assembly 44.

With reference to FIG. 3, airflow control nozzle assembly 44 is coupled to output face 50 of mixing chamber 40 and in fluid communication with output outlet 66. It should be understood that, according to the principles of the present disclosure, in some embodiments, nozzle assembly 44 can have a variety of conventional configurations. As illustrated in FIG. 3, nozzle assembly 44 includes a grip portion 84 which rotates to vary the spacing between funnel 86 with output aperture 87 and stop 88, to, in turn, vary the amount of airflow exiting gasper apparatus 20 at output aperture 87. In a preferred embodiment, nozzle assembly 44 is oriented concentrically within handle portion 70 of temperature control dial 42.

With further reference to FIG. 3, gasper apparatus 20 includes temperature range display 90 on outlet face 50 of mixing chamber 40 and a complementary mixing marker 92 on handle portion 70 of temperature control dial 42. Temperature range display 90 indicates the relative temperature differences of the air from first and second air supplies 30 and 32, and the position of marker 92 varies with the rotation of the handle portion 70 as illustrated in FIGS. 6A-6D in correspondence with the mix of the air from first and second air supplies 30 and 32. Accordingly, a user of gasper apparatus 20 can knowingly adjust temperature control dial 42 to provide for the desired airflow temperature, from a cooler mix to a warmer mix—ranging from substantially the temperature of the cool air inlet, up to substantially that of the warm air inlet.

In this preferred embodiment of the present disclosure, handle portion 70 temperature control dial 42 rotates between a first position and a second position relative to outlet face 50 of mixing chamber 40, such as the positions illustrated in FIGS. 6C-6D, with the first and second positions being substantially 135° from each other. In a preferred embodiment of the present disclosure, the first temperature of the air from first (cool) air supply 30 is substantially 60° F., and the second temperature of the air from second (warm)

air supply 32 is substantially 90° F. It should be understood that the range of motion of a temperature control dial and the temperatures of air supplied to a gasper apparatus disclosed herein are exemplary, and that both the range of motion and temperatures can vary within the principles of the present disclosure.

Referring to FIGS. 7-12, another exemplary temperature control gasper apparatus 120 is illustrated. According to the principles of the present disclosure, gasper apparatus 120 can be located in a vehicle interior, such as vehicle interior 22 illustrated in FIG. 1, to provide selectively variable airflow to users of the vehicle. More particularly, according to the principles of the present disclosure, gasper apparatus 120 integrate airflow temperature, volume and orientation control at the point of use of gasper apparatus 120 in vehicle interior 22. As such, according to the principles of the present disclosure, users of the vehicle, such as passengers of an aircraft, can adjust the direction, rate and temperature of the airflow from gasper apparatus 120 according to their respective individual preferences. It should be understood that the foregoing drawings and descriptions related to gasper apparatus 20, and the components thereof, including all embodiments disclosed, also apply to gasper apparatus 120 and the similar components thereof, if not otherwise disclosed herein.

Gasper apparatus 120, as shown in FIGS. 7-12, includes generally rounded mixing chamber 140, temperature control dial portion 142, and airflow control nozzle assembly 144. Mixing chamber 140 is an assembly of socket portion 151 and ball portion 153. Socket portion 151 is fixed to the vehicle interior at the point of installation of gasper apparatus 120. Socket portion 151 includes round base 200 and socket sidewall 202 extending therefrom in the manner of a bowl. Ball portion 153 includes ball sidewall 204 sized and shaped complementary to socket sidewall 202 such that socket sidewall 202 overlaps and engages ball sidewall 204, as particularly shown in FIG. 10. Ball portion 153 further includes a pair of base cylinder segments 206 extending from ball sidewall 204 and having threaded portions 208 formed on the outer surfaces thereof.

Mixing chamber 140 further includes first and second inlets 160 and 162 extending through base 200 of socket portion 151. Between socket portion 151 and ball portion 153, mixing chamber 140 defines interior mixing region 164. Socket portion 151 and ball portion 153 have a movable engagement between socket sidewall 202 and ball sidewall 204. In a preferred embodiment, socket sidewall 202 and ball sidewall 204 are arranged in a fluidly-sealed engagement. As further disclosed herein, ball portion 153 can be swiveled, as desired, relative to socket portion 151 to allow the direction of the airflow from gasper apparatus 120 to be varied, while enclosing air within mixing chamber 140 for output through nozzle assembly 144. Moreover, according to the principles of the present disclosure, first and second inlets 160 and 162 are in fluid communication with first and second air supplies at first and second temperatures, respectively, such as first and second air supplies 30 and 32 schematically illustrated in FIG. 1 and discussed herein with respect to gasper apparatus 20, and first and second inlets are in selective and variable fluid communication with interior mixing region 164.

Figure 12:
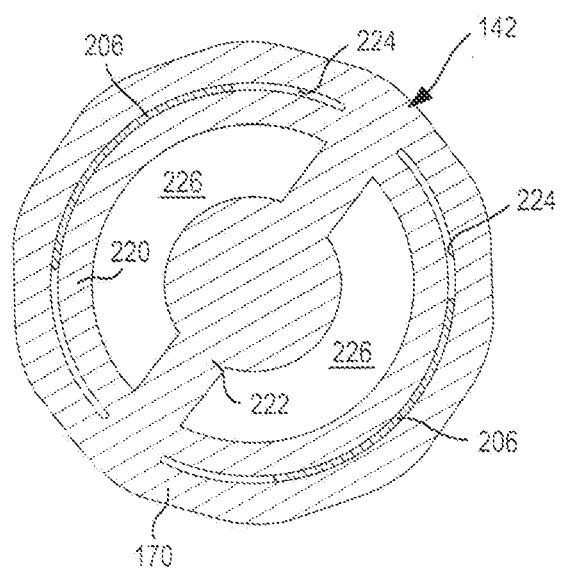
FIG. 12 is a cross-sectional view of the temperature control gasper apparatus of FIG. 7 along the line C-C of FIG. 7 and looking in the direction of the arrows.

Temperature control dial 142 includes annular handle portion 170 having grip portions 172 thereon to enable manipulation by a user of gasper apparatus 120. With particular reference to FIG. 12, temperature control dial 142 further includes first and second webbing segments 220 and 222 extending within handle portion 170. Between handle portion 170 and first and second webbing segments 220 and 222, temperature control dial 142 defines slots 224 for receiving base cylinder segments 206 of ball portion 153 of mixing chamber 140. Slots 224 are greater in size than base cylinder segments 206 to provide for relative motion between handle portion 170 and temperature control dial 142, on one hand, and ball portion 153 and mixing chamber 140, on the other. As further disclosed herein, such relative motion provides for the variation of air, from first and second air supplies with air at first and second temperatures, respectively, in fluid communication with interior mixing region 164 of mixing chamber 140 and, thus, the temperature control of gasper apparatus 120. Between handle portion 170 and first and second webbing segments 220 and 222, temperature control dial 142 also defines airflow apertures 226, which provide for fluid communication between interior mixing region 164 of mixing chamber 140 and nozzle assembly 144.

Figure 10:
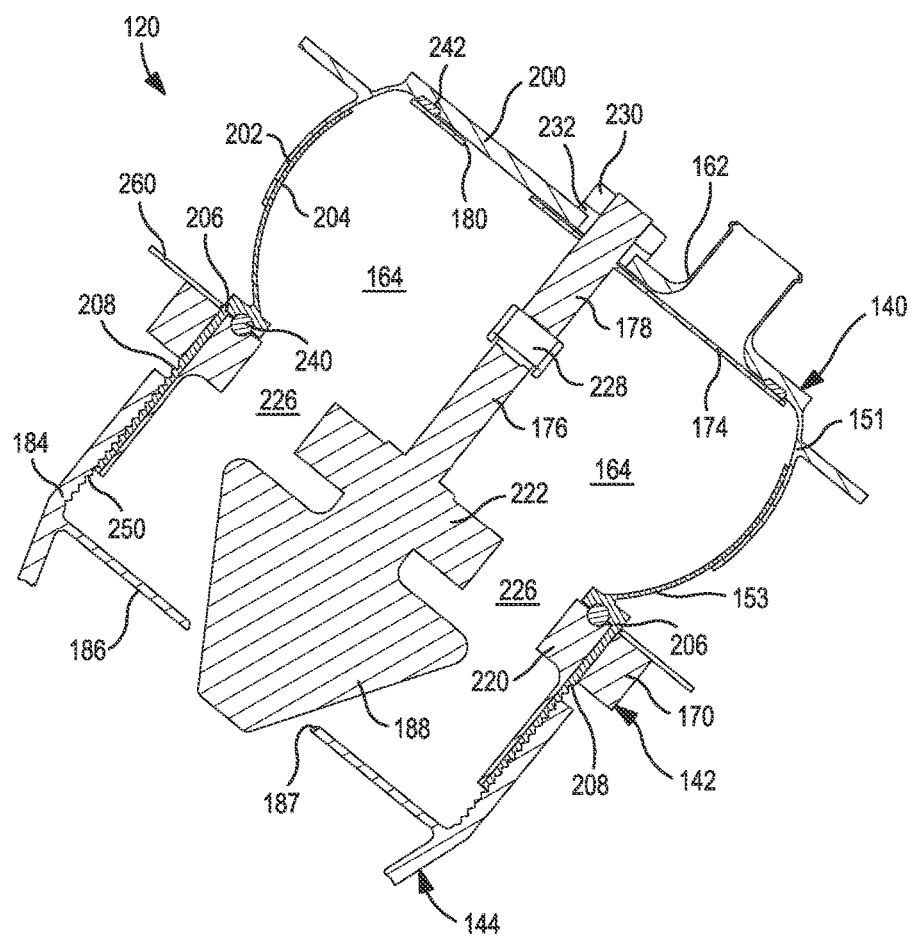
FIG. 10 is a cross-sectional view of the temperature control gasper apparatus of FIG. 7 along line A-A of FIG. 8, and looking in the direction of the arrows.

With particular reference to FIG. 10, temperature control dial 142 includes first and second support posts 176 and 178 coupled together in series by hinge member 228. Support post 176 is fixed to second webbing segment 222 and extends into interior mixing region 164 of mixing chamber 140. In yet other preferred embodiments, handle portion 170, first and second webbing segments 220 and 222 and first support post 176 are integrally formed in a unitary body.

Second support post 178 of temperature control dial 142 is rotatably coupled to base 200 of socket portion 151 of mixing chamber 140 by nut 230 and seal 232. Second support post 178 rotates about its lengthwise axis, but its orientation relative to base 200 is otherwise fixed. Hinge 228 rotatably fixes first support post 176 and second support post 178 such that rotation transfers between first support post 176 and second support post 178. Hinge 228 further provides for the orientation of first support post 176 to vary relative to the orientation of second support post 178 while maintaining the transfer of rotation. Accordingly, handle portion 170, first and second webbing segments 220 and 220 and first support post 176 can all swivel with ball portion 153 of mixing chamber 140 relative to second support post 178 and socket portion 151 of mixing chamber 140.

Temperature control dial 142 further includes a seal portion 174 fixed relative to second support post 178. Seal portion 174 includes first and second apertures 180 and 182 extending therethrough. First and second apertures 180 and 182 are positioned complementary to first and second inlets 160 and 162 such that, in the intermediate position illustrated in FIG. 11, first aperture 180 and first inlet 160 partially overlap while second aperture 182 and second inlet 162 partially overlap. With seal portion 174 and second support post 178 rotatably fixed to first support post 176 and handle portion 170, the position of seal portion 174 relative to first and second inlets 160 and 162 varies with the rotation of handle portion 170, as similarly described with respect to gasper apparatus 20 and FIGS. 6A-6D herein.

Figure 8:
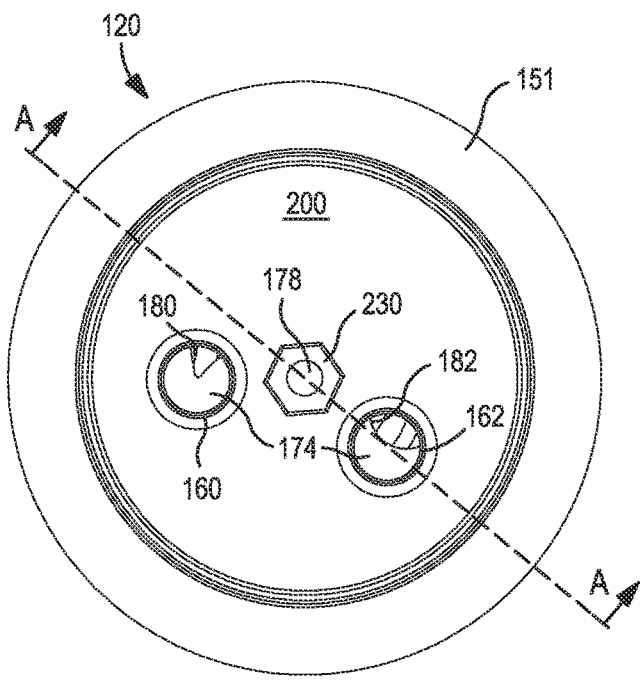
FIG. 8 is a top plan view of the temperature control gasper apparatus of FIG. 7.
Figure 11:
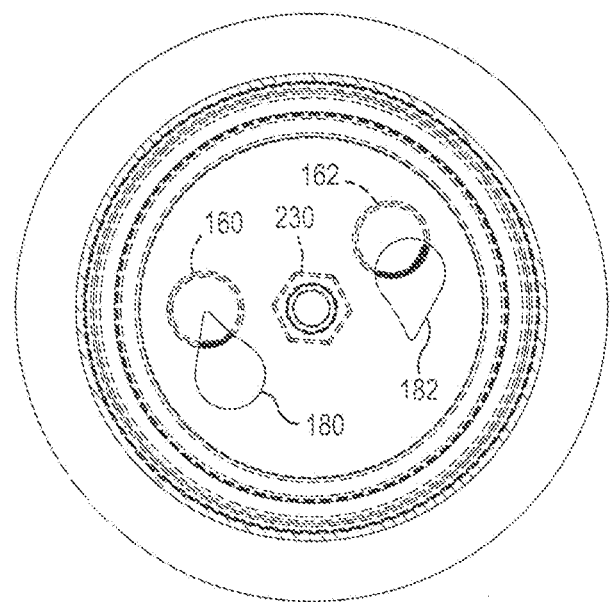
FIG. 11 is a cross-sectional view of the temperature control gasper apparatus of FIG. 7 along the line B-B of FIG. 7 and looking in the direction of the arrows.

As illustrated in FIGS. 8 and 11, first and second apertures 180 and 182 can have teardrop shapes, respectively. With particular reference to FIG. 8, teardrop shapes of first and second apertures 180 and 182 can provide a tapering of the amount of airflow at first and second inlets 160 and 162, respectively, as handle portion 170 nears its extreme positions with one of first and second inlets 160 and 162 being sealed off from fluid communication with interior mixing region 164. For example, when sealed portion 174 is rotated proximate the position with first aperture 180 spaced apart from first inlet 160, the tapered portion of the first aperture 180 overlaps first inlet 160. This tapering provides a user with an enhanced ability to fine-tune the precise mix of air at first and second temperatures that is desired, as neither the air at the first temperature from first inlet 160 nor the air at the second temperature from second inlet 162 are abruptly cut-off from interior mixing region 164.

In this preferred embodiment, gasper apparatus 120 includes fluid sealing rings 240 and 242 disposed between mixing chamber 140 and temperature control dial 142 to inhibit undesired leakage of air. Referring in particular to FIG. 10, sealing ring 240 is provided between first webbing segment 220 of temperature control dial 142 and ball portion 153 of mixing chamber 140. Sealing ring 242 is provided between seal portion 174 of temperature control dial 142 and the interior surface of base 200 of socket portion 151 of mixing chamber 140. It should be understood that gasper apparatus 120 can be sealed in a variety of ways to prevent undesired leakage according to the principles of the present disclosure.

Nozzle assembly 144 includes cylindrical grip portion 184 having threaded portion 250 formed therein and interior wall 186 extending therein. Nozzle assembly 144 is engaged with ball portion 153 of mixing chamber 140 through the threaded engagement of threaded portion 250 of grip portion 184 and threaded portions 208 of base cylinder segments 206 of ball portion 153. Interior wall 186 of nozzle assembly 144 includes output aperture 187 extending therethrough. Nozzle assembly 144 further includes conical stop 188 which is complementary sized to output aperture 187. Stop 188 is fixed relative to handle portion 170 and first and second webbing segments 220 and 222 of temperature control dial 142. In some embodiments, stop 188 is integrally formed handle portion 170, first and second webbing segments 220 and 222 and first support post 176 in a unitary body.

Nozzle assembly 144 varies the amount of airflow output at output aperture 187, as rotation of grip member 184 relative to ball portion 153 of mixing chamber 140 axially moves output aperture 187 relative to stop 188. According to the principles of the present disclosure, gasper apparatus 120 provides airflow output control with rotation of grip member 184 of nozzle assembly 144 relative to ball portion 153 of mixing chamber 140, temperature control by concentric rotation of handle portion 170 of temperature control dial 142 relative to ball portion 153 of mixing chamber 140, and airflow direction control by swivel movement of ball portion 153 of mixing chamber 140 relative to socket portion 151.

Figure 9:
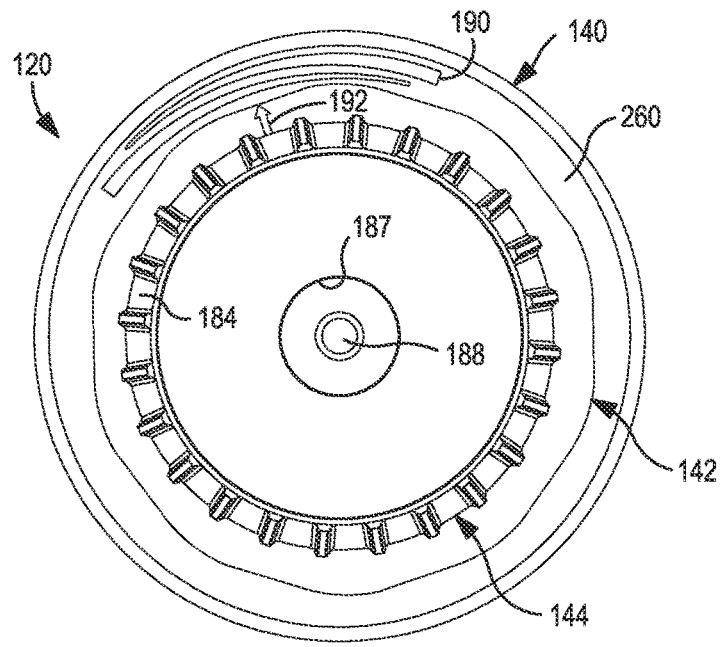
FIG. 9 is a bottom plan view of the temperature control gasper apparatus of FIG. 7.

With particular reference to FIG. 9, gasper apparatus 120 further includes display flange 260 fixed to ball portion 153 of mixing chamber 140, temperature range display 190 on display flange 260 and a complementary mixing marker 192 on handle portion 170 of temperature control dial 142. Temperature range display 190 indicates the relative temperature differences of the air from the first and second air supplies in fluid communication with first and second inlets 160 and 162, respectively, and the position of marker 192 varies with the rotation of the handle portion 170 in correspondence with the mix of the air from the first and second air supplies as permitted to enter interior mixing region 164 by seal portion 174 and first and second apertures 180 and 182. Accordingly, a user of gasper apparatus 120 can knowingly adjust temperature control dial 142 to provide for the desired airflow temperature.

As exemplified herein, the present disclosure can vary in many ways. For example, it should be understood that a temperature control gasper apparatus according to the principles of the present disclosure can be used in a variety of constructions for a variety of vehicular applications. Additionally, the materials and shapes of the components of a temperature control gasper apparatus according to the principles of the present disclosure can vary, and remain within the scope of this invention. Accordingly, it is to be understood that the present disclosure is exemplary in nature.

What is claimed is:

1. A temperature control gasper apparatus for integrating elements for controlling the temperature, volume and orientation control of airflow at a single location within a vehicle interior, said gasper apparatus comprising:

a socket having an interior surface, an exterior surface, a substantially planar socket base, and a socket bowl opposite said socket base, said socket base being affixed to the vehicle interior and having an interior surface and an exterior surface;

a substantially planar seal portion juxtaposed and rotatably coupled to the interior surface of the socket base, said seal portion having a first aperture, a second aperture, a top side and a bottom side;

a first inlet positioned behind the top side of said seal portion, said first inlet being in fluid communication with a first air supply at a first temperature;

a second inlet positioned behind the top side of said seal portion, said second inlet being in fluid communication with a second air supply at a second temperature, said second temperature being different from said first temperature;

a ball element having an interior surface, an exterior surface, a base cylinder end and a sidewall end opposite said base cylinder end, the exterior surface of said ball element being operably coupled along the sidewall end, and within the interior surface, of said socket bowl, said ball element being configured to swivel therewithin said socket, said interior surfaces of both said ball element and said socket collectively defining an inlet mixing chamber that extends from the socket base to the base cylinder end of said ball element, said inlet mixing chamber serving as a region in which the air supplied by said first and second air supplies may be mixed, said first aperture of said seal portion being positioned in a rotatably variable orientation relative to said first inlet and said second aperture of said seal portion being positioned in a rotatably variable orientation relative to said second inlet and configured to vary the amount of air from said first and second air supplies being directed to said inlet mixing chamber, to in turn vary the temperature of said airflow;

a temperature control dial positioned proximate the base cylinder end of the ball element, said temperature control dial having a handle portion that is operably coupled to said seal portion, to control the variable alignment of each of the first and second inlets with each of the first and second apertures, to enable said variable amount of air supplied by each of said first and second air supplies to advance into the inlet mixing chamber;

an airflow control nozzle assembly having a grip portion capable of swiveling the ball portion within the socket portion, said airflow control nozzle assembly further comprising:

a grip cylinder having a top end and a bottom end;

a base cylinder having a top end that is connected to the base cylinder end of said ball element and a bottom end that is adjustably operably connected to the top end of said grip cylinder, configured to variably control a volume of airflow emanating therefrom; and an interior wall proximate the bottom end of said grip cylinder, said interior wall having an output aperture configured to cooperate with a stop member, to alternatively, variably release and stop the volume of airflow exiting therefrom, said base cylinder, said grip cylinder, said interior wall and said stop member collectively defining nozzle assembly chamber which is in fluid communication with said inlet mixing chamber.

2. The temperature control gasper apparatus of claim 1, wherein rotation of said grip cylinder relative to said base cylinder axially moves said output aperture relative to said stop member, to alternatively enlarge and diminish the airflow from said nozzle assembly chamber as desired.

3. The temperature control gasper apparatus of claim 1, wherein said first and second apertures of said seal portion each include a tapered portion.

4. The temperature control gasper apparatus of claim 3 wherein said first and second apertures are each teardrop-shaped.

5. The temperature control gasper apparatus of claim 3, wherein said first aperture is oriented such that said tapered portion aligns with said first inlet when said seal portion is rotated proximate said second position from said first position, and said second aperture is oriented such that said tapered portion aligns with said second inlet when said seal portion is rotated proximate said first position from said second position.

6. The temperature control gasper apparatus of claim 1, wherein said base cylinder includes an exterior surface having an outwardly facing threaded portion, said grip cylinder including an interior surface having an inwardly facing threaded portion, and said grip cylinder and said base cylinder being configured to operably engage each other at said threaded portions to axially move said output aperture relative to said stop member.

7. The temperature control gasper apparatus of claim 1, further comprising an annular sealing ring operably positioned to create a seal between the socket base and the top side of said seal portion.

8. The temperature control gasper apparatus of claim 1, further comprising an annular sealing ring coupled between the base cylinder end of said ball element and said handle portion of said temperature control dial.

9. The temperature control gasper apparatus of claim 1, wherein said gasper apparatus controls a temperature of airflow via the cooperation of said first and second apertures of said seal portion with said first and second inlets, respectively, to selectively enable variable fluid communication between said first and second inlets and said inlet mixing chamber, upon rotation of said handle portion of said temperature control dial, and in turn said seal portion, relative to the socket base.

10. The temperature control gasper apparatus of claim 1, wherein said gasper apparatus controls a volume of airflow via the cooperation of said output aperture in said interior end wall with said stop member, to substantially seal said output aperture and prevent fluid communication between said nozzle assembly chamber and said output aperture, upon the complete closure of said output aperture by said stop member, upon rotation of said grip cylinder relative to said base cylinder.

11. The temperature control gasper apparatus of claim 1, wherein said gasper apparatus provides airflow direction control via the swiveling of said ball element within said socket.

* * * * *